(12) United States Patent
Kim et al.

(10) Patent No.: US 8,380,867 B2
(45) Date of Patent: Feb. 19, 2013

(54) METHOD OF TRANSMITTING/RECEIVING STREAMING DATA IN COMMUNICATION SYSTEM INCLUDING SERVER AND MOBILE COMMUNICATION TERMINAL, AND COMMUNICATION SYSTEM THEREFOR

(75) Inventors: Yong-Gyoo Kim, Seoul (KR); Tae-Sung Park, Yongin-si (KR); Do-Young Joung, Seoul (KR); Gil-Yoon Kim, Suwon-si (KR); Yong-Hyun Lim, Seoul (KR)

(73) Assignee: Samsung Electronics Co., Ltd (KR)

( * ) Notice: Subject to any disclaimer, the term of this patent is extended or adjusted under 35 U.S.C. 154(b) by 357 days.

(21) Appl. No.: 12/536,763

(22) Filed: Aug. 6, 2009

(65) Prior Publication Data
US 2010/0036965 A1    Feb. 11, 2010

(30) Foreign Application Priority Data

Aug. 6, 2008  (KR) .................. 10-2008-0076983

(51) Int. Cl.
*G06F 15/16*    (2006.01)
(52) U.S. Cl. .................. 709/231; 709/227; 709/228
(58) Field of Classification Search .......... 709/227–228, 709/131, 233–235, 238, 31; 370/229–235
See application file for complete search history.

(56) References Cited

U.S. PATENT DOCUMENTS

| | | | |
|---|---|---|---|
| 2002/0012395 A1* | 1/2002 | Song et al. ............... | 375/240.03 |
| 2002/0165970 A1* | 11/2002 | Ludewig ................... | 709/228 |
| 2003/0083870 A1 | 5/2003 | Lee et al. | |
| 2003/0169813 A1* | 9/2003 | Van Der Schaar ....... | 375/240.12 |
| 2004/0202109 A1* | 10/2004 | Akiyama et al. .......... | 370/235 |
| 2007/0204056 A1 | 8/2007 | Deshpande | |
| 2008/0064425 A1* | 3/2008 | Kim et al. ................. | 455/466 |
| 2009/0259766 A1* | 10/2009 | Karlsson et al. ........... | 709/231 |
| 2009/0260045 A1* | 10/2009 | Karlsson et al. ........... | 725/93 |

FOREIGN PATENT DOCUMENTS

| | | |
|---|---|---|
| EP | 1 672 870 | 6/2006 |
| KR | 1020030035525 | 5/2003 |
| KR | 1020060019410 | 3/2006 |

OTHER PUBLICATIONS

Igor D.D. Curcio et al., "Application Rate Adaptation for Mobile Streaming", Proceedings of the Sixth IEEE International Symposium on a World of Wireless Mobile and Multimedia Networks (WoWMoM'05), Jun. 2005.

* cited by examiner

*Primary Examiner* — Abdullahi Salad
(74) *Attorney, Agent, or Firm* — The Farrell Law Firm, P.C.

(57) ABSTRACT

Disclosed are a method of transmitting/receiving streaming data, to which a bit rate suitable for a mobile communication terminal is applied, in a communication system including a server and the mobile communication terminal, and a communication system therefor. The communication system include the server for converting multimedia data into the streaming data, and transmitting the streaming data to the mobile communication terminal; and the mobile communication terminal for, on receiving the streaming data from the server, collecting streaming parameters for use to determine the bit rate, and newly determining the bit rate.

12 Claims, 4 Drawing Sheets

METHOD OF TRANSMITTING/RECEIVING STREAMING DATA IN COMMUNICATION SYSTEM INCLUDING SERVER AND MOBILE COMMUNICATION TERMINAL, AND COMMUNICATION SYSTEM THEREFOR

PRIORITY

This application claims priority to an application entitled "Method of Transmitting/Receiving Streaming Data in Communication System Including Server and Mobile Communication Terminal, and Communication System Therefor" filed in the Korean Industrial Property Office on Aug. 6, 2008 and assigned Serial No. 10-2008-0076983, the contents of which are hereby incorporated by reference.

BACKGROUND OF THE INVENTION

1. Field of the Invention

The present invention relates to a method of transmitting/receiving streaming data in a communication system including a server and a mobile communication terminal. More particularly, the present invention relates to a method of transmitting/receiving streaming data, to which a bit rate suitable for a mobile communication terminal is applied, in a communication system including a server and the mobile communication terminal, and the communication system therefor.

2. Description of the Related Art

In the conventional 3GPP ($3^{rd}$ Generation Partnership Project), a mobile communication terminal transmits transport layer information and reception decoding buffer status information to a server by using a Real-time Transmission Control Protocol (RTCP). The server determines a bit rate suitable for data transmission/reception to/from the mobile communication terminal by referring to the received transport layer information and decoding buffer status information.

FIG. 1 illustrates a conventional communication system for transmitting/receiving streaming data.

The conventional communication system includes a server 10 and a mobile communication terminal 20. The server 10 includes a bit rate determiner 12 for determining a bit rate corresponding to a data conversion rate used to convert multimedia data into streaming data, and a multimedia converter 14 for converting multimedia data into streaming data.

The server 10 converts multimedia data into streaming data by using a pre-stored bit rate, and transmits the streaming data to the mobile communication terminal 20. On receiving the streaming data, the mobile communication terminal 20 decodes and reproduces the streaming data, and feeds back to the server 10 streaming parameters, such as transport layer information and decoding buffer status information. The mobile communication terminal 20 detects the streaming parameters and transmits them to the server 10 whenever streaming data is transmitted from the server 10, or transmitted in a given cycle.

Such streaming parameters represent the communication environment between the server 10 and the mobile communication terminal 20. However, since the streaming parameters correspond only to incidental data communicated between the server 10 and the mobile communication terminal 20, the streaming parameters may waste bandwidth of a communication channel formed between the server 10 and the mobile communication terminal 20. Information fed back from the mobile communication terminal 20 to the server 10 is inevitably limited, and the accuracy of a bit rate determined by the server 10 decreases as the amount of information fed back from the mobile communication terminal 20 to the server 10 decreases.

In addition, since the streaming parameters used when the server 10 determines the bit rate only include information regarding data transmission between the server 10 and the mobile communication terminal 20, the server 10 determines the bit rate without regard to the reproduction quality in reproducing the streaming data in the mobile communication terminal 20, and thus it is difficult for the server 10 to determine a bit rate suitable for the reproduction environment of the mobile communication terminal 20.

Therefore, there is a need for a system and method for transmitting/receiving streaming data, which can effectively determine a bit rate so as to reduce the waste of a communication bandwidth in communication between a server and the a mobile communication terminal, and to improve reproduction quality when the mobile communication terminal reproduces streaming data.

SUMMARY OF THE INVENTION

Accordingly, the present invention has been made to solve at least the above-mentioned problems occurring in the prior art, and the present invention provides a method of transmitting/receiving streaming data, to which a bit rate suitable for a mobile communication terminal is applied, in a communication system including a server and the mobile communication terminal, and a communication system therefor.

In accordance with an aspect of the present invention, there is provided a communication system for transmitting/receiving streaming data, the communication system including a server for converting multimedia data into the streaming data by using a pre-stored first bit rate in order to convert the multimedia data into the streaming data, and transmitting the streaming data to a mobile communication terminal; and the mobile communication terminal for, on receiving the streaming data from the server, collecting streaming parameters for use to determine a second bit rate, determining the second bit rate by using the collected streaming parameters, and reporting the determined second bit rate to the server.

In accordance with another aspect of the present invention, there is provided a method of transmitting/receiving streaming data in a communication system including a server and a mobile communication terminal connected to the server, the method including converting multimedia data into the streaming data by using a pre-stored first bit rate, and transmitting the streaming data to the mobile communication terminal by the server; and on receiving the streaming data from the server, collecting streaming parameters for use to newly determine a second bit rate, determining second bit rate by using the collected streaming parameters, and reporting the determined second bit rate to the server by the mobile communication terminal.

In accordance with yet another aspect of the present invention, there is provided a method of receiving streaming data by a mobile communication terminal in a communication system including a server and the mobile communication terminal connected to the server, the method including collecting streaming parameters to determine a bit rate that is a data conversion rate for use to convert multimedia data into the streaming data; determining the bit rate by using the collected streaming parameters; reporting the determined bit rate to the server; and receiving the streaming data, into which the multimedia is converted using the bit rate, from the server.

BRIEF DESCRIPTION OF THE DRAWINGS

The above and other objects, features and advantages of the present invention will be more apparent from the following detailed description taken in conjunction with the accompanying drawings, in which.

DETAILED DESCRIPTION OF THE EXEMPLARY EMBODIMENT

Figure 1:
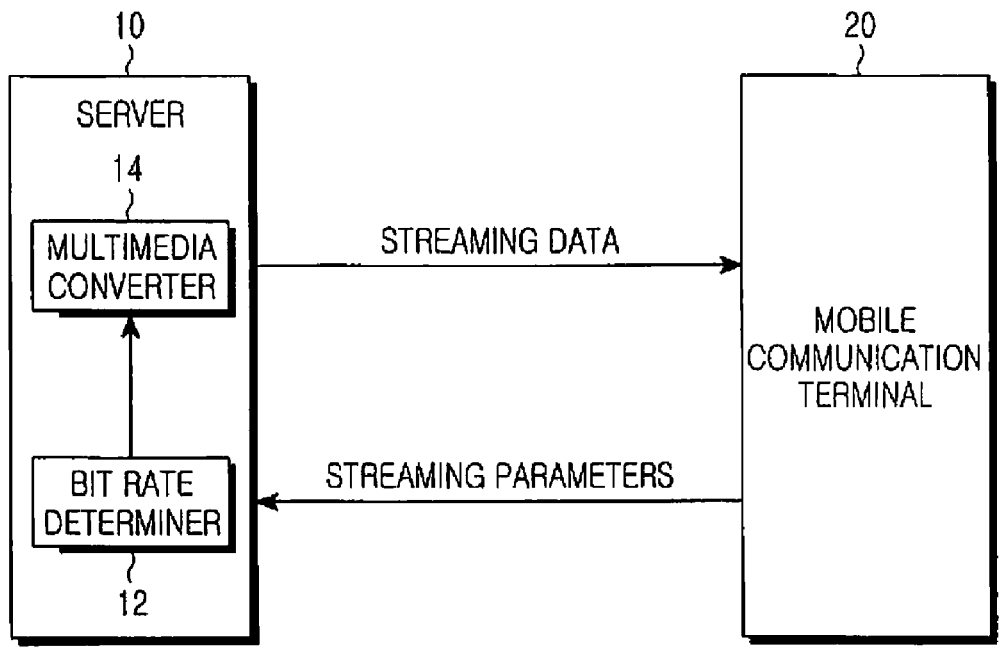
FIG. 1 is a block diagram illustrating a conventional communication system for transmitting/receiving streaming data.

Hereinafter, embodiments of the present invention will be described with reference to the accompanying drawings. It should be noted that the similar components are designated by similar reference numerals although they are illustrated in different drawings. Also, in the following description, a detailed description of known functions and configurations incorporated herein will be omitted when it may obscure the subject matter of the present invention. Further, it should be noted that only parts essential for understanding the operations according to the present invention will be described and a description of parts other than the essential parts will be omitted in order not to obscure the gist of the present invention.

Figure 2:
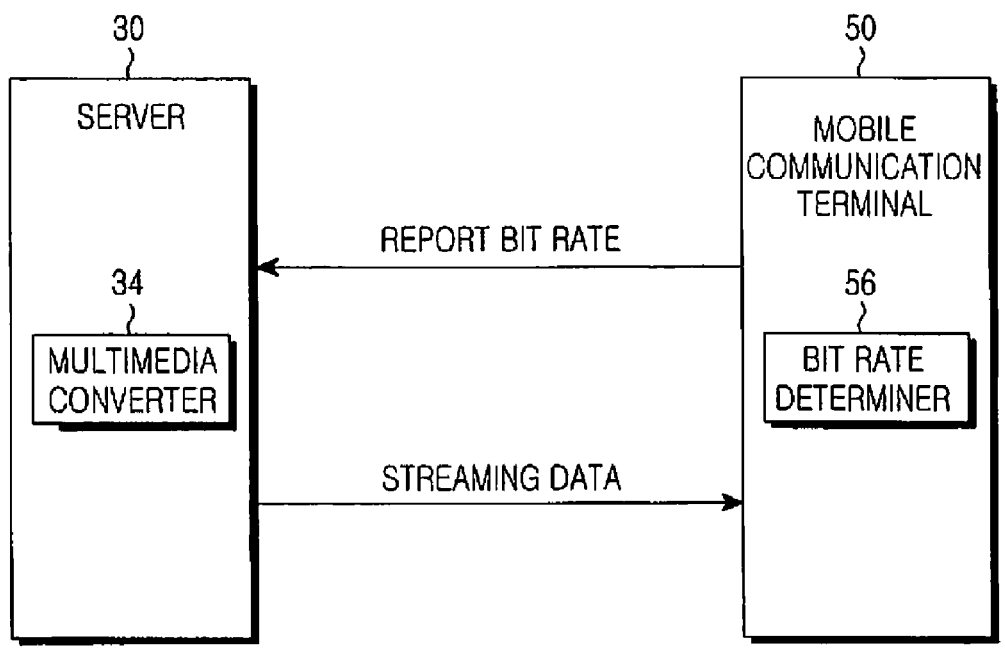
FIG. 2 is a block diagram illustrating a communication system for transmitting/receiving streaming data in accordance with an embodiment of the present invention.

FIG. 2 illustrates a communication system for transmitting/receiving streaming data according to an embodiment of the present invention.

The communication system includes a server 30 and a mobile communication terminal 50. The mobile communication terminal 50 determines a bit rate, and reports the determined bit rate to the server 30. The server 30 converts multimedia data into streaming data by using the bit rate reported from the mobile communication terminal 50.

To this end, the server 30 may include a multimedia converter 34 for converting pre-stored multimedia data into streaming data, and the mobile communication terminal 50 may include a bit rate determiner 56 for a bit rate corresponding to a data conversion rate that is required for the server to convert the multimedia data into the streaming data.

The server 30 or mobile communication terminal 50 may transmit/receive streaming data by using a real-time transmission control protocol (RTCP). Also, the mobile communication terminal 50 may provide a user with the streaming data transmitted through the RTCP by reproducing the streaming data in real time.

Figure 3:
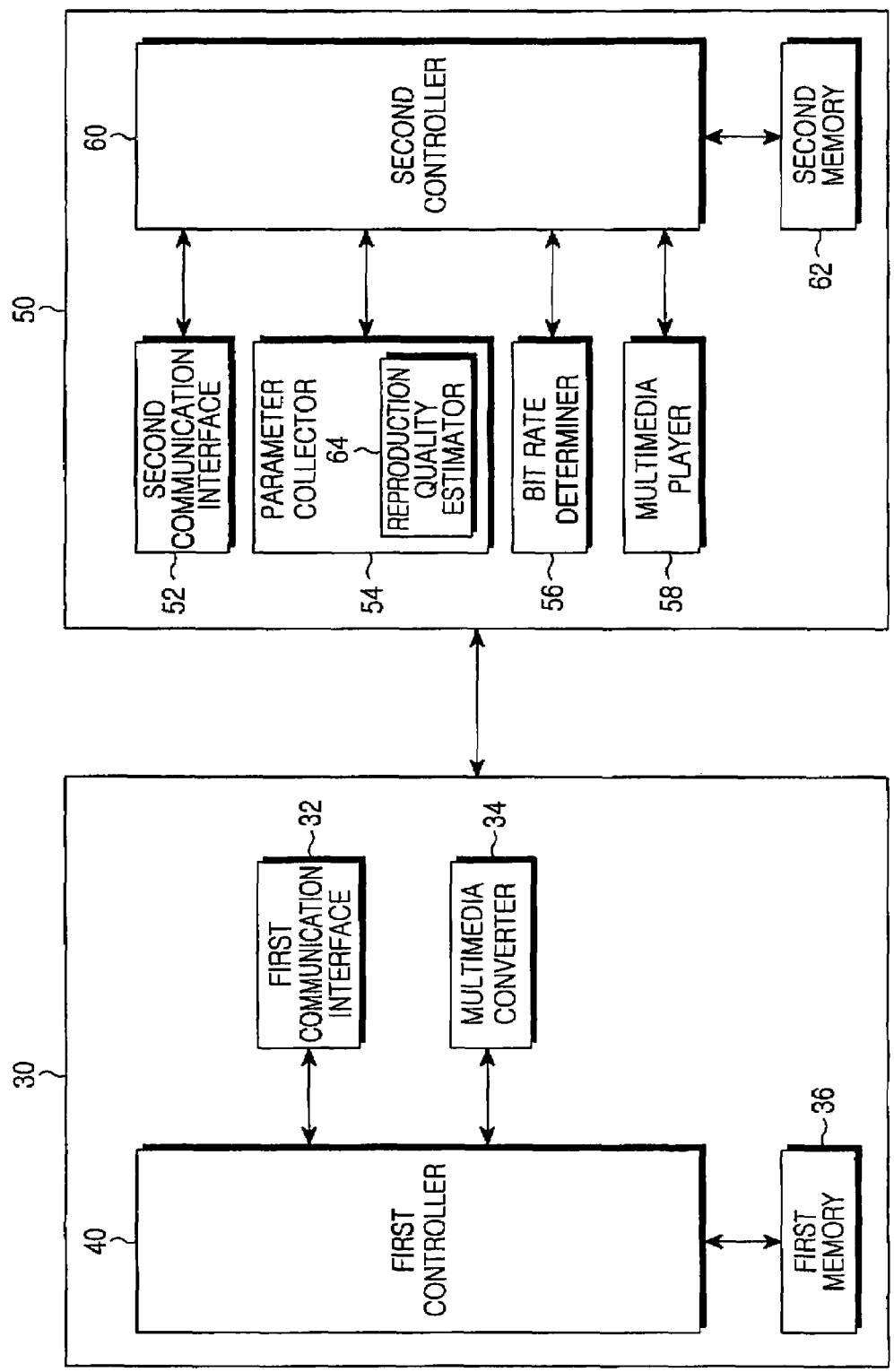
FIG. 3 is a block diagram illustrating structures of a server and a mobile communication terminal in a communication system for transmitting/receiving streaming data in accordance with an embodiment of the present invention.

FIG. 3 illustrates structures of a server and a mobile communication terminal in a communication system for transmitting/receiving streaming data according to an embodiment of the present invention.

The server 30 includes a first communication interface 32 and a multimedia converter 34, and may further include a first memory 36 and a first controller 40.

The first communication interface 32 transmits streaming data to the mobile communication terminal 50, and receives a bit rate transmitted from the mobile communication terminal 50.

The multimedia converter 34 converts multimedia data into streaming data. The multimedia converter 34 converts multimedia data into streaming data by using a bit rate transmitted from the mobile communication terminal 50 through the first communication interface 32. The bit rate refers to a data conversion rate that is used when multimedia data in a non-compressed format is converted into streaming data in a compressed format. The multimedia converter 34 may convert multimedia data in a non-compressed format into streaming data in a compressed format, which has a transmission rate of, for example, 64 kbps or 128 kbps.

A multimedia converter 34 may convert multimedia data into streaming data by using a bit rate that is pre-stored in the first memory 36 to be described below.

The first memory 36 stores multimedia data or a bit rate transmitted from the mobile communication terminal 50. Also, the first memory 36 may be in a state where a bit rate for use to convert multimedia data into streaming data is pre-stored therein.

The first controller 40 controls the overall operation of the server 30. The first controller 40 controls the multimedia converter 34 to convert multimedia data into streaming data by using a bit rate pre-stored in the first memory 36. Also, when the mobile communication terminal 50 reports a bit rate to the server 30, the first controller 40 may update the pre-stored bit rate to the reported bit rate, and store the updated bit rate in the first memory 36.

The mobile communication terminal 50 includes a second communication interface 52, a parameter collector 54, and a bit rate determiner 56, and may further include a multimedia player 58, a second controller 60, and a second memory 62. Herein, the parameter collector 54 may further include a reproduction quality estimator 64.

The second communication interface 52 receives streaming data transmitted from the server 30, and transmits to the server 30 a bit rate, which is determined by the bit rate determiner to be described below. The second communication interface 52 receives streaming data and reports a bit rate to the server 30 through an RTCP.

The parameter collector 54 collects streaming parameters, which are indicative of the communication environment between the server 30 and the mobile communication terminal 50, and are used to determine a bit rate. The parameter collector 54 transfers the streaming parameters to the bit rate determiner 56 so that the bit rate determiner 56 can determine the bit rate. Such streaming parameters may include transport layer information, decoding buffer status information, wireless channel information, reproduction quality estimation information, etc.

The transport layer information is information on the transport layer of the mobile communication terminal 50, and includes, for example, a Packet Loss Rate (PLR), a jitter representing the transmission delay deviation of a packet, etc. The decoding buffer status information is information on a buffer where streaming data is decoded on the mobile communication terminal 50, and includes the Oldest Buffered Sequence Number (OBSN), playout delay, etc. The wireless channel information is includes information on the physical layer or Medium Access Control (MAC) layer on the mobile communication terminal 50, and so forth. The reproduction quality estimation information is a value measured by the reproduction quality estimator 64, to be described below, and may be represented by a mean opinion score according to the reproduction quality.

The reproduction quality estimator 64 estimates the reproduction quality of streaming data transmitted from the server 30 through the second communication interface 52. The reproduction quality estimator 64 may represent the reproduction quality of streaming data by an Mean Opinion Score (MOS). For example, the reproduction quality estimator 64 may represent the reproduction quality of streaming data by a value of 1 to 9.

The bit rate determiner 56 determines a bit rate required for the multimedia converter 34 of the server 30 to convert multimedia data into streaming data. When streaming data is first received from the server 30, the bit rate determiner 56 may newly determine a bit rate by using a bit rate used for the received streaming data and a Modulation and Coding Scheme (MCS) level pre-stored in the second memory 62, under the control of the second controller 60. The MCS level is a level regarding modulation and channel coding combinations. According to the MCS level, communication between the server 30 and the mobile communication terminal 50 may be made using 16QAM (16 Quadrature Amplitude Modulation) scheme, 64QAM (64 Quadrature Amplitude Modulation), QPSK (Quadrature Phase Shift Keying), BPSK (Binary Phase Shift Keying), or the like.

Using the transport layer information, decoding buffer status information, etc. transferred from the parameter collector 54, the condition of a communication channel used for communication between the server 30 and the mobile communication terminal 50 may be determined. The bit rate determiner 56 determines a bit rate depending on the condition of the communication channel.

For example, it is assumed that the condition of the communication channel has a value of "WORST", "BAD", "NORMAL", "GOOD", or "BEST" in order from the worst condition to the best condition. The bit rate determiner 56 decreases the value of a bit rate when the condition of the communication channel has a value of "WORST" or "BAD", maintains the value of a bit rate when the condition of the communication channel has a value of "NORMAL", and increases the value of a bit rate when the condition of the communication channel has a value of "GOOD" or "BEST".

The bit rate determiner 56 may determine a bit rate depending on the reproduction quality of streaming data, under the control of the second controller 60, to be described below. The bit rate determiner 56 determines a bit rate depending on reproduction quality estimated by the reproduction quality estimator 64. For example, it is assumed that the reproduction quality of streaming data, estimated by the reproduction quality estimator 64, has a value of "WORST", "BAD", "NORMAL", "GOOD", or "BEST" in order from the worst quality to the best quality. The bit rate determiner 56 decreases the value of a bit rate when the reproduction quality estimated by the reproduction quality estimator 64 has a value of "WORST" or "BAD", maintains the value of a bit rate when the reproduction quality has a value of "NORMAL", and increases the value of a bit rate when the reproduction quality has a value of "GOOD" or "BEST".

The multimedia player 58 reproduces streaming data received through the second communication interface 52. The multimedia player 58 may reproduce streaming data, received from the server 30, in real time through an RTCP.

The second memory 62 may store an MSC level and a bit rate transmitted from the server 30 or determined by the bit rate determiner 56, under the control of the second controller 60.

The second controller 60 controls the overall operation of the mobile communication terminal 50. The second controller 60 compares a current bit rate with a previous bit rate to thereby determine if they are the same.

When the current bit rate is not the same as the previous bit rate, the second controller 60 controls the second communication interface 52 to report the bit rate determined by the bit rate determiner 56 to the server 30. On the contrary, when the current bit rate is the same as the previous bit rate, the second controller 60 maintains the previous bit rate. In that case, the second controller 60 may not perform any separate operation.

Figure 4:
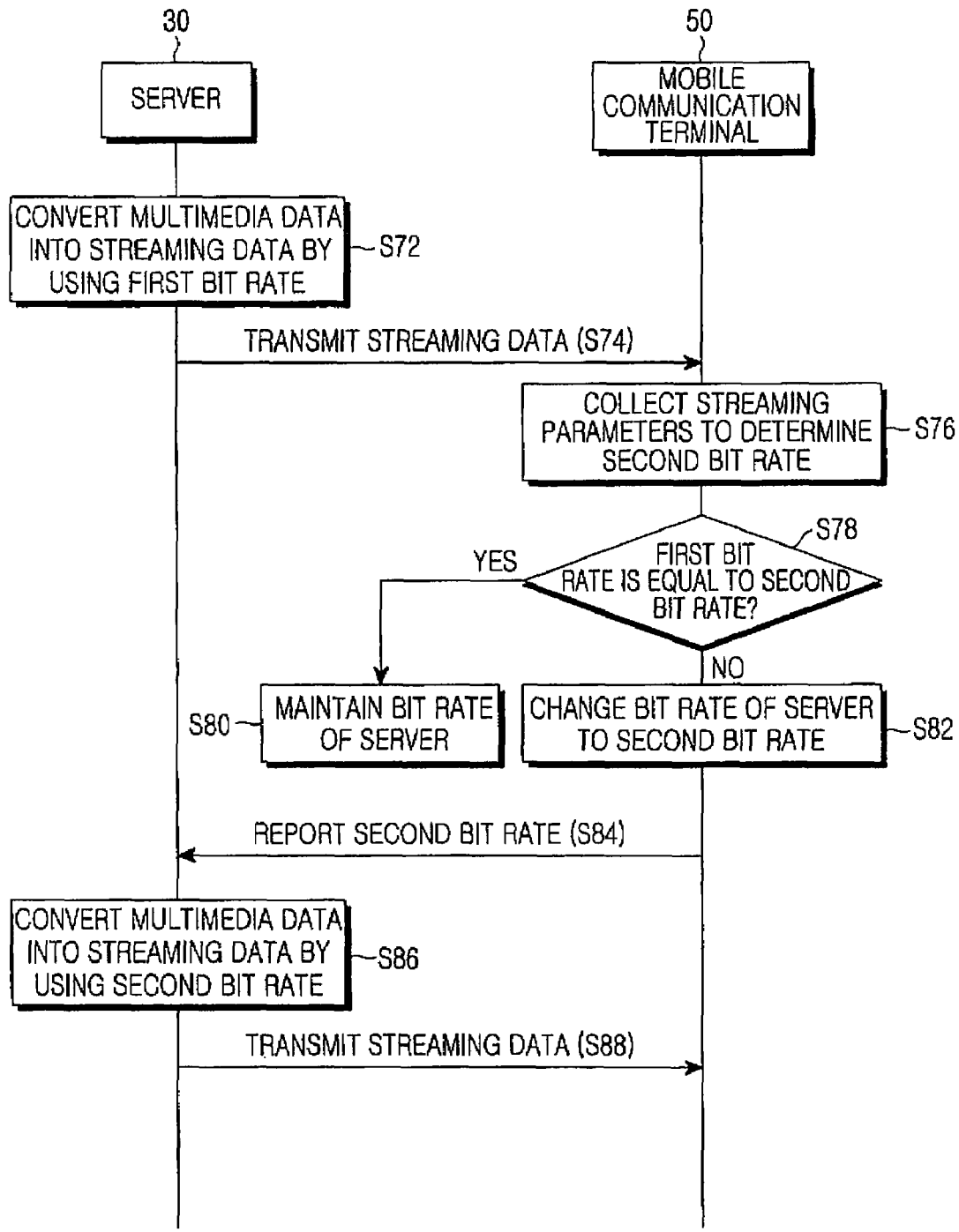
FIG. 4 is a flowchart illustrating a method of transmitting/receiving streaming data in a communication system including a server and a mobile communication terminal.

FIG. 4 illustrates a method of transmitting/receiving streaming data in a communication system including a server and a mobile communication terminal according to an exemplary embodiment of the present invention.

A bit rate pre-stored in the server 30 is referred to as "a first bit rate", and a bit rate newly determined by the mobile communication terminal 50 is referred to as "a second bit rate".

The server 30 converts multimedia data into streaming data by using a first bit rate in step S72. That is, the multimedia converter 34 of the server 30 converts multimedia data into streaming data by using a first bit rate pre-stored in the first memory 36.

If the streaming data is transmitted from the server 30 in step S74, the mobile communication terminal 50 collects streaming parameters to determine a second bit rate in step S76. That is, the parameter collector 54 of the mobile communication terminal 50 collects streaming parameters, and the bit rate determiner 56 of the mobile communication terminal 50 determines a second bit rate by using the collected streaming parameters.

The second controller 60 of the mobile communication terminal 50 determines if the first bit rate is the same as the second bit rate in step S78. When the first bit rate is the same as the second bit rate, the second controller 60 maintains the bit rate of the server 30. Subsequently, the multimedia converter 34 of the server 30 converts multimedia data into streaming data by using the first bit rate.

When the first bit rate is not the same as the second bit rate, the second controller 60 changes the bit rate of the server 30 to the second bit rate in step S82. That is, the second controller 60 determines the second bit rate as a new data conversion rate. Subsequently, the second controller 60 of the mobile communication terminal 50 reports the second bit rate to the server 30 in step S84. On receiving the second bit rate from the mobile communication terminal 50, the server 30 may delete the first bit rate stored in the first memory 36, and store the second bit rate in the first memory, under the control of the first controller 40. That is, the first controller 40 may control the server 30 to store and maintain the second bit rate as the bit rate of the corresponding mobile communication terminal 50.

Subsequently, the server 30 converts multimedia data into streaming data by using the second bit rate in step S86, and transmits the streaming data, into which the multimedia data is converted using the second bit rate, to the mobile communication terminal 50 in step S88.

Although not illustrated in the drawing, steps S72 to S84 may be repeated. That is, the mobile communication terminal 50 may determine a bit rate in consideration of the current state thereof and the condition of a communication channel between the sever 30 and the mobile communication terminal 50 by repeatedly performing steps S72 to S84 whenever streaming data is determined from the server 30 or in the cycle pre-stored in the second memory 56.

Figure 5:
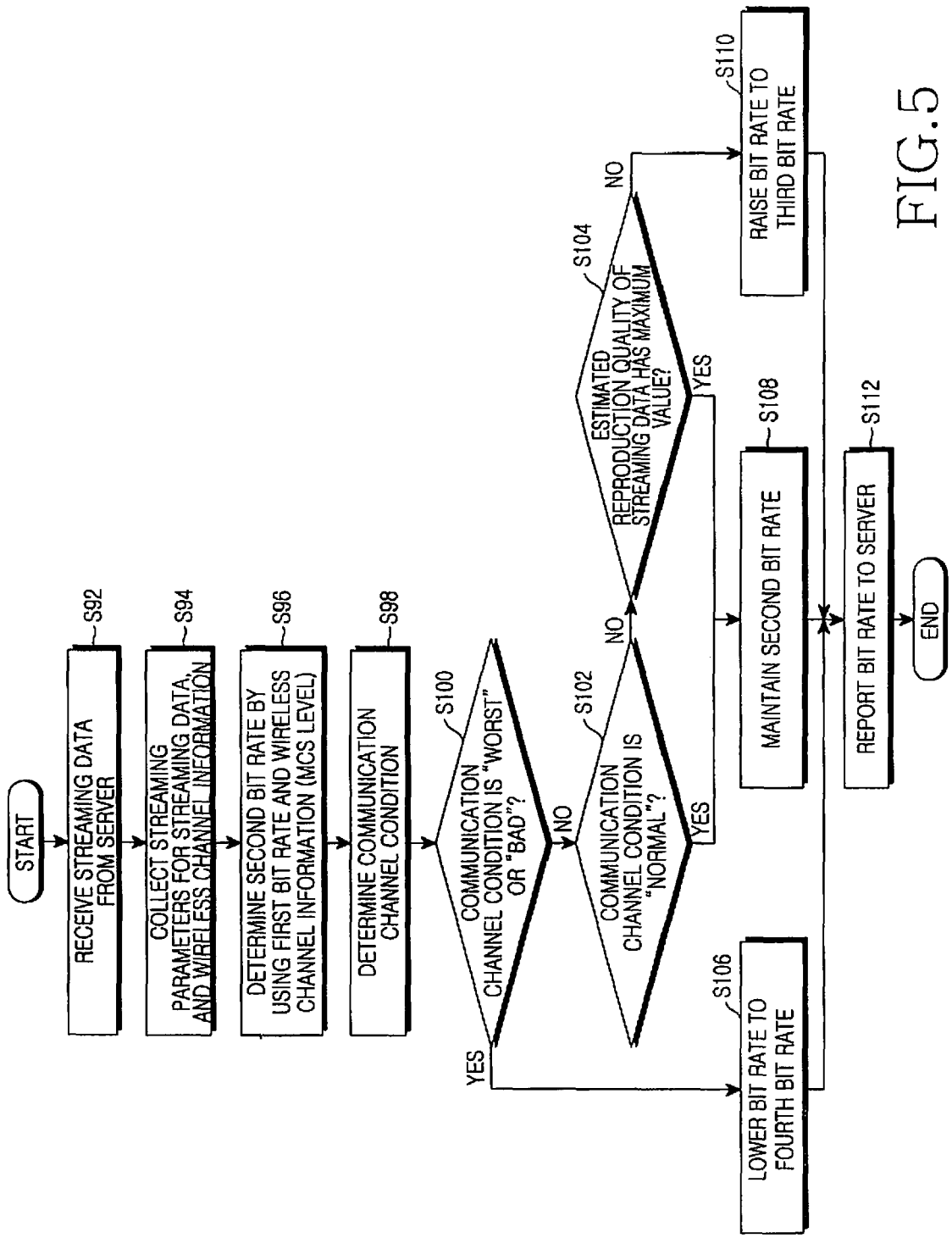
FIG. 5 is a flowchart illustrating a method of determining a bit rate by a mobile communication terminal in accordance with an embodiment of the present invention.

FIG. 5 illustrates a method of determining a bit rate by a mobile communication terminal according to an embodiment of the present invention.

The mobile communication terminal 50 receives streaming data from the server 30 through the second communication interface 52 in step S92. Herein, it is assumed that the server 30 has converted multimedia data into the streaming data by using a bit rate pre-stored therein, which corresponds to a first bit rate. The server 30 is in a state where its first memory 32 pre-stores a first bit rate as a bit rate for the mobile communication terminal 50.

The bit rate determiner 56 of the mobile communication terminal 50 determines a second bit rate by using the first bit rate and a pre-stored MCS level in step S94. Then, the second communication interface 52 reports the second bit rate determined in step S94 to the server 30, under the control of the second controller 60. Subsequently, the server 30 converts multimedia data into streaming data by using the second bit rate.

Since a bit rate used to convert multimedia data into streaming data is changed from the first bit rate to the second bit rate, the mobile communication terminal 50 receives streaming data, into which multimedia data is converted using the second bit rate, from the server 30 in step S96. The mobile communication terminal 50 collects streaming parameters for the streaming data through the parameter collector 54 and the reproduction quality estimator 64, and determines a channel condition by using the collected streaming parameters in step S98.

The bit rate determiner 56 according to this embodiment may determine a bit rate depending on the condition of a communication channel between the server 30 and the mobile communication terminal 50 by using transport layer information and decoding buffer status information from among the streaming parameters collected by the parameter collector 54. In this embodiment, the channel condition is largely divided into four conditions, that is, "GOOD", "NORMAL", "BAD", and "WORST". Also, it is assumed that the mobile communication terminal 50 may receive streaming data by using a third or fourth bit rate, as well as the first and second bit rates depending on each channel condition.

The bit rate determiner 56 determines if the channel condition corresponds to "WORST" or "BAD" in step S100. This means that the condition of the communication channel used between the server 30 and the mobile communication terminal 50 gets much worse. The mobile communication terminal 50 decreases the value of a bit rate when the communication environment is worsened, for example, when a frequency bandwidth gets narrow or traffic carried on the communication channel increases, thereby making it possible to effectively transmit/receive data.

That is, when a result of the determination in step S100 shows that the channel condition corresponds to "WORST" or "BAD" the bit rate determiner 56 of the mobile communication terminal 50 lowers the current bit rate to a fourth bit rate. Herein, the fourth bit rate may be a minimum bit rate at which the mobile communication terminal 50 can receive streaming data, and the server 30 cannot convert multimedia data into streaming data by using a bit rate smaller than the fourth bit rate. The mobile communication terminal 50 informs the server 30 of the determined bit rate (i.e. the fourth bit rate) by transmitting it to the server 30 in step S112.

Contrarily, when a result of the determination in step S100 shows that the channel condition does not correspond to "WORST" or "BAD", the bit rate determiner 56 determines if the channel condition corresponds to "NORMAL" in step S102. When the channel condition corresponds to "NORMAL", the bit rate determiner 56 maintains the second bit rate determined in step S96 in step S108. The mobile communication terminal 50 informs the server 30 of the determined bit rate (i.e. the second bit rate) by transmitting it to the server 30 in step S112.

When a result of the determination in step S102 shows that the channel condition does not correspond to "NORMAL", the channel condition naturally corresponds to "GOOD". Thus, the bit rate determiner 56 determines if the estimated reproduction quality of the streaming data has a maximum value in step S104. When the estimated reproduction quality has the maximum value, the bit rate determiner 56 maintains the second bit rate in step S108, and informs the server 30 of the determined bit rate (i.e. the second bit rate) by transmitting it to the server 30 in step S112.

On the other hand, when a result of the determination in step S104 shows that the estimated reproduction quality of the streaming data does not have the maximum value, the bit rate determiner 56 raises the current bit rate to a third bit rate so that the reproduction quality of the streaming data can have the maximum value in step S110. Herein, the third bit rate is assumed as an optimal value at which the reproduction quality of the streaming data can maintain its best quality when the channel condition corresponds to "GOOD", and simultaneously the bandwidth cannot be wasted.

In this way, if the channel environment becomes better, the mobile communication terminal 50 can increase the value of a bit rate so as to improve the reproduction quality of streaming data, and consequently a user can be provided with better quality of data. Also, the reason why a current bit rate is maintained when reproduction quality has a maximum value is that the reproduction quality of streaming data is not usually improved any more when the reproduction quality has the maximum value. That is, the mobile communication terminal 50 can maintain the best reproduction quality when streaming data is reproduced, and simultaneously can eliminate factors for the deterioration of the communication environment between the server 30 and the mobile communication terminal 50, such as a waste of the bandwidth, which may be caused by having a bit rate greater than necessary.

According to the present invention as described above, a method is provided, which can transmit/receive streaming data, to which a bit rate suitable for a mobile communication terminal is applied, in a communication system including a server and the mobile communication terminal, and a communication system therefor is provided.

Also, by determining a bit rate in consideration of the communication environment between a server and a mobile communication terminal, the server and the mobile communication terminal can efficiently transmit/receive streaming data therebetween while flexibly coping with changes in the communication environment.

Further, since a mobile communication terminal estimates the reproduction quality of streaming data, and adjusts a bit rate depending on the estimated reproduction quality, a waste of bandwidth or deterioration of the reproduction quality can be prevented.

While the invention has been shown and described with reference to a certain exemplary embodiment thereof, it will be understood by those skilled in the art that various changes in form and details may be made therein without departing from the spirit and scope of the invention as defined by the appended claims and equivalents thereof.

What is claimed is:

1. A method of receiving streaming data by a mobile communication terminal in a communication system including a server and the mobile communication terminal connected to the server, the method comprising the steps of:

receiving, from the server, a first streaming data into which a first multimedia data is converted using a first bit rate pre-stored in the server;

collecting streaming parameters to determine a second bit rate that is a data conversion rate for use to convert a second multimedia data into a second streaming data;

determining the second bit rate using the collected streaming parameters;

reporting the second bit rate to the server; and receiving the second streaming data, into which the second multimedia is converted using the second bit rate, from the server, wherein the streaming parameters include the first bit rate and reproduction quality estimation information, wherein determining the second bit rate comprises determining if the reproduction quality estimation information has a value greater than or equal to a pre-stored maximum value, and maintaining the first bit rate as a current bit rate, when the reproduction quality estimation information has a value greater than or equal to the pre-stored maximum value, and determining if the reproduction quality estimation information has a value less than or equal to a pre-stored minimum value, and maintaining the first bit rate as a current bit rate, when the reproduction quality estimation information has a value less than or equal to the pre-stored minimum value.

2. The method as claimed in claim 1, wherein the second multimedia data is converted into the second streaming data using the second bit rate by the server, and the second streaming data is transmitted from the server to the mobile communication terminal.

3. The method as claimed in claim 1, further comprising: determining if the second bit rate is equal to the first bit rate, wherein when the second bit rate is not equal to the first bit rate, the second bit rate is reported to the server.

4. The method as claimed in claim 1, wherein the streaming parameters further include transport layer information, decoding buffer status information and wireless channel information.

5. The method as claimed in claim 1, further comprising: generating the reproduction quality estimation information by estimating reproduction quality of the first streaming data, wherein the second bit rate is determined based on the generated reproduction estimation information.

6. A mobile communication terminal for transmitting/receiving streaming data, the mobile communication terminal comprising:

a communication interface for receiving, from a server, a first streaming data into which a first multimedia data is converted using a first bit rate pre-stored in the server;

a parameter collector for collecting streaming parameters;

a bit rate determiner for determining a second bit rate using the collected streaming parameters, the second bit rate being a data conversion rate used to convert a second multimedia data into a second streaming data; and a controller for controlling the communication interface to report the second bit rate to the server and receive the second streaming data, into which the second multimedia data is converted using the second bit rate, from the server, wherein the streaming parameters include the first bit rate and reproduction quality estimation information, wherein determining the second bit rate comprises determining if the reproduction quality estimation information has a value greater than or equal to a pre-stored maximum value, and maintaining the first bit rate as a current bit rate, when the reproduction quality estimation information has a value greater than or equal to the pre-stored maximum value, and determining if the reproduction quality estimation information has a value less than or equal to a pre-stored minimum value, and maintaining the first bit rate as a current bit rate, when the reproduction quality estimation information has a value less than or equal to the pre-stored minimum value.

7. The mobile communication terminal as claimed in claim 6, wherein the second multimedia data is converted into the second streaming data using the second bit rate by the server, and the second streaming data is transmitted from the server to the mobile communication terminal.

8. The mobile communication terminal as claimed in claim 6, wherein the controller determines if the second bit rate is equal to the first bit rate, and the controller controls the communication interface to report the second bit rate to the server when the first bit rate is not equal to the second bit rate.

9. The method as claimed in claim 6, wherein the streaming parameters further include transport layer information, decoding buffer status information and wireless channel information.

10. The method as claimed in claim 6, wherein the controller generates the reproduction quality estimation information by estimating reproduction quality of the first streaming data, and wherein the second bit rate is determined based on the generated reproduction estimation information.

11. The method as claimed in claim 10, wherein the controller determines if the reproduction quality estimation information has a value greater than or equal to a pre-stored maximum value, and the controller maintains the first bit rate as a current bit rate when the reproduction quality estimation information has a value greater than or equal to the maximum value.

12. The method as claimed in claim 10, wherein the controller determines if the reproduction quality estimation information has a value less than or equal to a pre-stored minimum value, and the controller maintains the first bit rate as a current bit rate when the reproduction quality estimation information has a value less than or equal to the minimum value.

* * * * *